(12) United States Patent
Tyler

(10) Patent No.: US 7,249,774 B1
(45) Date of Patent: Jul. 31, 2007

(54) FRONT AND REAR WHEEL STEERING FOR A VEHICLE

(76) Inventor: Nelson Tyler, 14218 Aetna St., Van Nuys, CA (US) 91403

( * ) Notice: Subject to any disclaimer, the term of this patent is extended or adjusted under 35 U.S.C. 154(b) by 264 days.

(21) Appl. No.: 10/830,880

(22) Filed: Apr. 26, 2004

Related U.S. Application Data

(60) Provisional application No. 60/542,356, filed on Feb. 9, 2004.

(51) Int. Cl.
*B62M 1/00* (2006.01)
(52) U.S. Cl. .................................. 280/87.041
(58) Field of Classification Search ............ 280/87.01, 280/87.021, 87.041, 87.042, 842; 180/408, 180/409, 410
See application file for complete search history.

(56) References Cited

U.S. PATENT DOCUMENTS

| | | | | |
|---|---|---|---|---|
| 1,866,393 A | * | 7/1932 | Brooks | 180/410 |
| 2,001,647 A | * | 5/1935 | Alt | 180/409 |
| 2,834,605 A | * | 5/1958 | McCollough | 180/410 |
| 4,093,252 A | * | 6/1978 | Rue | 280/87.042 |
| 5,954,349 A | * | 9/1999 | Rutzel | 280/87.041 |
| 5,992,865 A | * | 11/1999 | Vargas | 280/87.042 |
| 6,270,096 B1 | * | 8/2001 | Cook | 280/87.042 |
| 6,386,562 B1 | * | 5/2002 | Kuo | 280/87.042 |
| 6,520,517 B1 | * | 2/2003 | Chung et al. | 280/87.042 |

* cited by examiner

*Primary Examiner*—Frank Vanaman
(74) *Attorney, Agent, or Firm*—Colin P. Abrahams

(57) ABSTRACT

A steering and transmission mechanism interconnects the front and rear wheels of an in-line vehicle which includes rigid steering members or links operable by manual control for selectively determining rear wheel positioning from a normal turn or straight position to a crab position. Each member has adjacent ends selectively coupled together by a lock-arm movable in response to a manual control to change rear wheel positions. The steering members are slidably carried on a shifter housing and a resilient device is employed for returning steering from the crab position to the normal steering position.

15 Claims, 2 Drawing Sheets

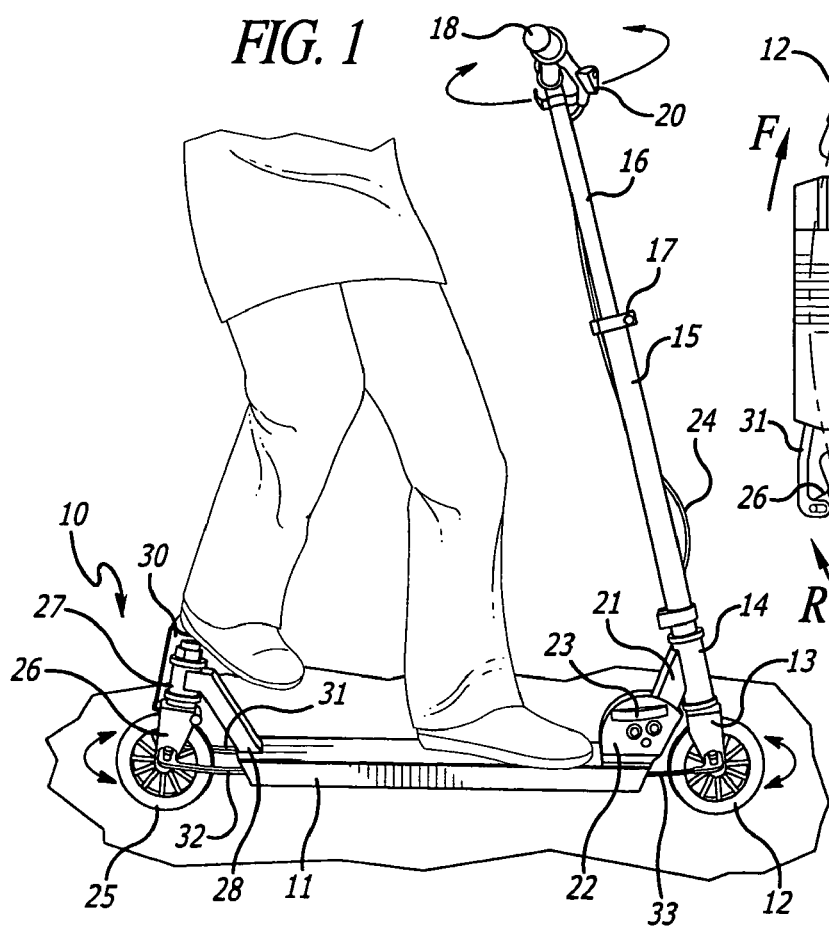
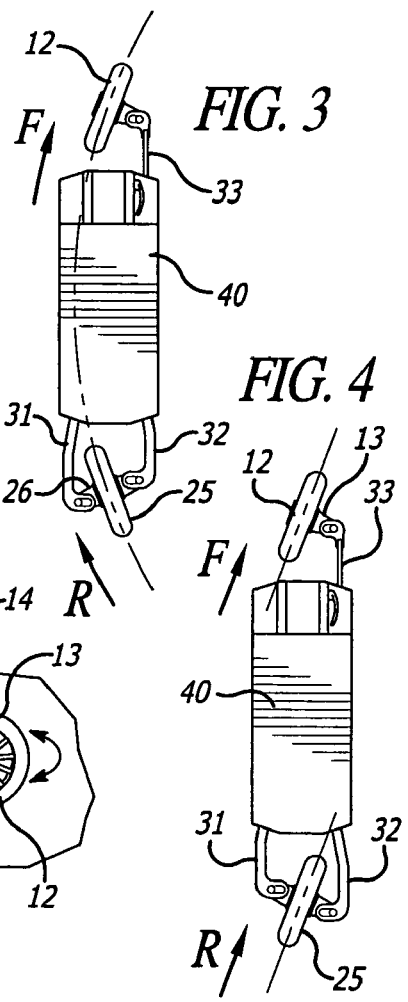
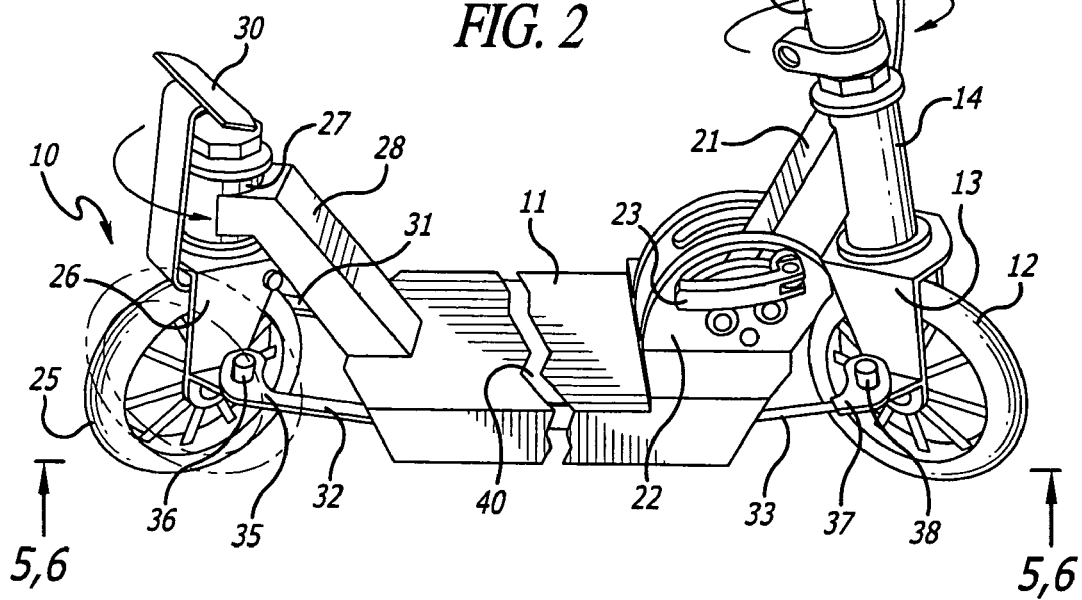

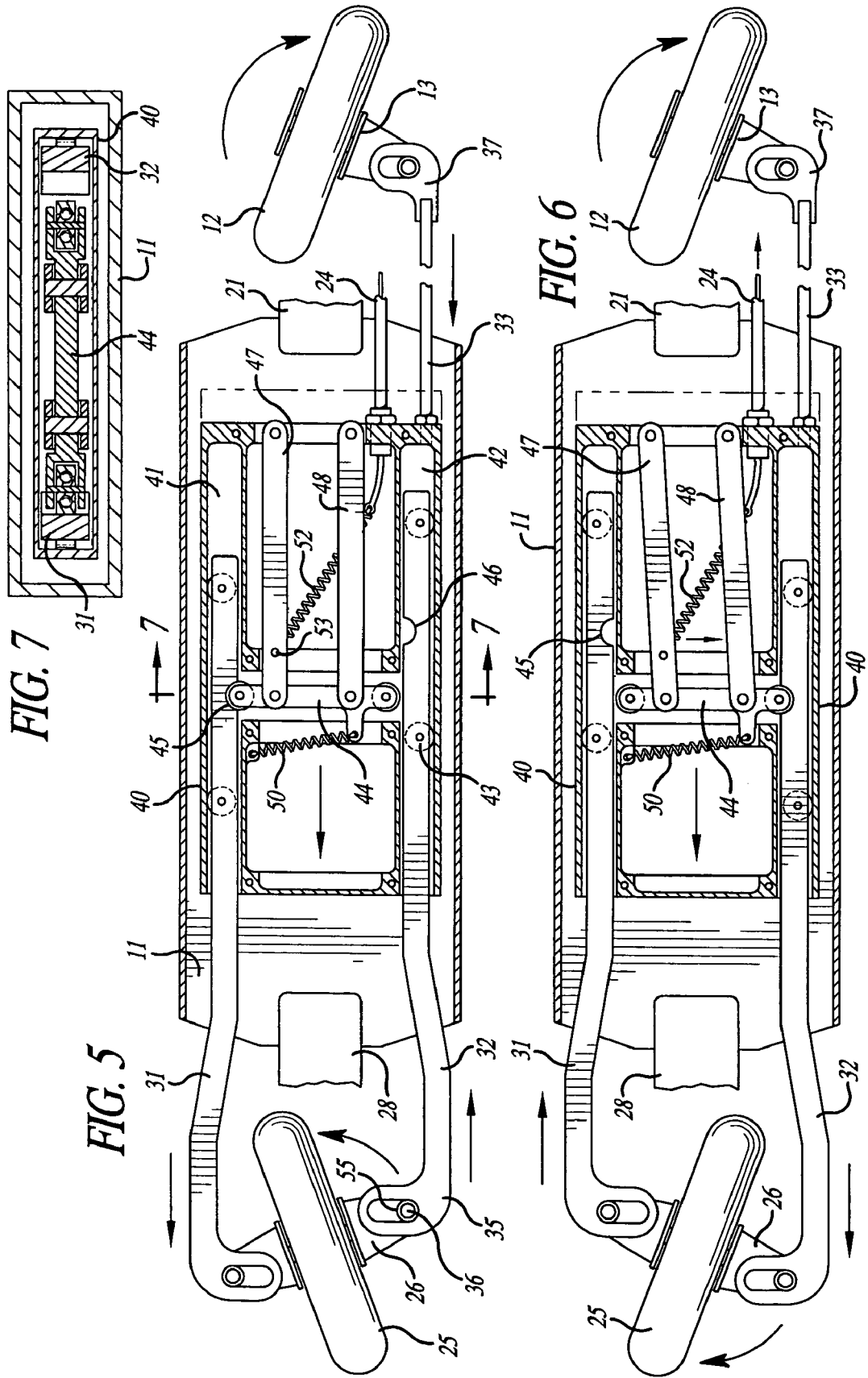

FRONT AND REAR WHEEL STEERING FOR A VEHICLE

Priority claimed on Ser. No. 60/542,356 filed Feb. 9, 2004 pending.

BACKGROUND OF THE INVENTION

1. Field of the Invention

The present invention relates to the field of vehicle steering, and more particularly to a steering transmission mechanism interconnecting front and rear wheels so as to maneuver the vehicle with respect to a longitudinal axis in an arcuate path, a linear path or in a linear angular path.

2. Brief Description of the Prior Art

Maneuverability of a conventional in-line wheeled vehicle, such as a scooter, is limited due to the fact that the front and rear wheels track along a common path that restricts maneuvering. In some instances, maneuverability is increased by permitting rotation or pivoting of the rear wheel to follow the front wheel so that a curvilinear path is followed which allows for more turning freedom and a shorter turning radius. Such examples are disclosed in U.S. Pat. No. 5,954,349, No. 4,799,702, and No. 4,555,122.

However, problems and difficulties have been encountered with these conventional vehicles, which stem largely from the fact that all the interconnecting mechanisms or transmission means between the front and rear wheels are directly connected to and are supported on the vehicle frame. The prior mechanisms rely on cable and pulley arrangements which have a tendency to stretch creating slack or "play" during structural flexing. In other instances, strings, complicated flexible linkages and rider body weight balancing techniques are employed to effect rear wheel pivoting so as to track with the front wheel. Still others, such as disclosed in U.S. Pat. No. 3,620,547 (FIG. 6) permit both turning of the front and rear wheels so as to track along a linear or curvilinear path as well as allowing the wheels to track in parallel in angular relation to the longitudinal axis of the frame wherein such a maneuver gains "crab" maneuvering. Again, it is the shifting of the rider or driver's weight which achieves the pivoting of the rear wheel to effect such maneuvering.

In none of the above reference disclosures is there provision of a mechanism not supported or directly fastened to the frame that employs a rigid mechanism to effect shift or change from turn-steering to crab-steering by manual switch-over control.

Therefore, a long-standing need has existed to provide a steering and transmission assembly for a vehicle, such as an in-line scooter, that is rigidly connected between the front and rear wheels and operable to alternately cause the rear wheel to track the front wheel in a curvilinear path or to cause the rear wheel to pivot parallel to the front wheel where both wheels are in an angular "crab" path with respect to the center line of the vehicle and wherein the assembly is supported on the front and rear wheel assembly without connection or support on the frame of the vehicle.

SUMMARY OF THE INVENTION

Accordingly, the above problems and difficulties are avoided by the present invention which provides a novel steering and transmission means interconnecting the front and rear wheels of an in-line vehicle which includes rigid steering members operable by manual control for selectively determining rear wheel positioning. Each member has adjacent ends selectively coupled together by a lock-arm movable in response to a manual control to change wheel positions. The steering members are slidably carried on a shifter housing and resilient means are employed for returning steering from a crab position to a normal steering position.

In one form, a first steering member is employed for normal turn-steering and has one end connected to a pivotal rear wheel fork. A second member is for crab-steering having one end thereof attached to the opposite side of the rear fork. A movable shifter lock-arm extends between the free ends of the first and second members for selectively positioning the rear wheel to either normal or crab steering positions.

Therefore, it is among the primary objects of the present invention to provide a novel vehicle, such as a scooter, with alternate turn-steering and crab-steering wheel positions, having a manually operated shift mechanism for controlling the orientation of the rear wheel.

Another object of the present invention is to provide a shifting and transmission mechanism for a two-wheel push scooter capable of manually converting turn-steering to crab-steering while the user is riding the scooter by using a hand control.

Still a further object of the invention is to provide a steering and transmission mechanism for the front and rear wheels of a vehicle wherein there are no attached points or support of the steering linkage or shifter unit to the main framework of the scooter.

Yet another object of the present invention is to provide a vehicle, such as a scooter, which includes a folding handlebar as well as a front and rear wheel shifting and transmission assembly which do not interfere with the function of either folding or steering operations.

A further object resides in providing a scooter which is capable of two-wheel steering, wherein each wheel is turned in opposite directions in order to cause a turning motion but which can also be shifted so both wheels can be steered with the wheels aligned in parallel with each other that permits the scooter to travel sideways.

A further object of the present invention is to provide a steering and transmission means for interconnecting the front and rear wheels of a vehicle so that the wheels may be pivoted in an angular orientation with respect to the center line or longitudinal axis of the scooter in order to effect sideways travel of the scooter.

Another object resides in a vehicle having two-wheel steering in which each wheel is turned in opposite directions so as to cause a turning motion which alternately can be shifted so both wheels can be steering with the wheels aligned in parallel with each other.

A feature resides in providing a manually operated shifting means for selecting rear wheel position for normal turn-steering or crab-steering and for shifting a two-wheel push scooter, or the like, from turn-steering to crab-steering while the operator is riding and back again by employing a hand control.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a side-elevational view illustrating an in-line vehicle, such as a scooter, employing the wheel shifter and transmission means incorporating the present invention;

FIG. 2 is an enlarged perspective view showing the front and rear wheels of the in-line vehicle wherein the pivotal rear wheel is pivotal with respect to the longitudinal axis of the vehicle frame;

FIG. 3 is a diagrammatic top plan view illustrating pivoting of the rear wheel to be in a curvilinear path tracking the front wheel with respect to the longitudinal axis of the frame;

FIG. 4 is a view, similar to the view of FIG. 3, illustrating the rear wheel in parallel with the front wheel to permit angular travel with respect to the longitudinal axis of the frame performing a crab-steering procedure;

FIG. 5 is a bottom sectional view of the shifting and transmission means incorporating the present invention as used on the vehicle shown in FIG. 2 in the direction of arrows 5-5 wherein the front and rear wheels follow a curvilinear path as shown in FIG. 3;

FIG. 6 is a bottom sectional view, similar to the view of FIG. 5, illustrating the front and rear wheels in position to achieve angular or crab-steering as illustrated in FIG. 4; and FIG. 7 is a transverse cross-sectional view of the shift and transmission means shown in FIG. 5, as taken in the direction of arrows 7-7 thereof.

DESCRIPTION OF PREFERRED EMBODIMENT

Referring to FIG. 1, a novel steering and transmission means for the front and rear wheels of an in-line vehicle is indicated in the general direction of arrow 10. Although the present invention relates to other types of vehicles, the present invention is illustrated in connection with an in-line scooter having a frame 11 on which the operator or driver of the scooter is supported. The front end of the scooter includes a front wheel 12 which is carried on a fork 13 which, in turn, is carried on a fixture 14 at the end of an elongated handle 15 which is collapsible. The handle includes an elongated tube for receiving an upper portion 16 that is adjusted for height and secured in position by a clamp 17. The upper end of portion 16 of the handle 15 includes handlebars 18 which supports manual lever control 20. The handle 15 including front fork 13 and front wheel 12 rotates with respect to the fixture 14 and it can be seen that the fixture 14 is attached to the frame 11 by a brace 21. The brace is further supported on the frame by a cam-lock device 22 which includes a locking handle 23. Therefore, it can be seen that the handle 15 may be shortened or lengthened by moving the portion 16 in and out of the tube in which it is mounted and that the handle can be folded towards the rear of the frame 11 by loosening the cam-lock 22 via handle 23 so that the brace 21 will travel through the yoke of the cam-lock device. So, it can be seen that the lever handle 20 for the shift mechanism is connected to a shift and transmission means under the frame 11 by a cable 24. Furthermore, when the handle 15 has been adjusted for height and securely locked in upright position, the front wheel 12 can be pivoted with respect to fixture 14 by twisting or turning handle 18 as in the direction of the double arrows shown.

The vehicle 10 further includes a rear wheel 25 that is rotatably carried on a rear fork 26. Fork 26 is rotatably carried on a rear fixture 27 that is attached to the rear of the frame 11 by a rear brace 28. A brake 30 is provided whereby the operator of the vehicle can depress the brake so that friction is applied to the rear wheel 25 as is the customary practice.

The wheels as illustrated in FIG. 1 are in an in-line arrangement where the rear wheel 25 tracks the same path as the front wheel 12. The front and rear wheels are illustrated lying on the central longitudinal axis of the frame 11 so that the vehicle will progress in a straight-forward line of travel. However, when it is desired to change position so that the vehicle travels in a turn position or to a crab position, linkage is provided such as a turn-steering link 31 and a crab-steering link 32. Also, the steering and shifting means within the frame 11 further includes a rigid steering rod 33 that is connected to the front fork 13.

Referring now in detail to FIG. 2, it can be seen that the rear wheel 25 can be rotated or pivoted in alternate directions as shown in broken and solid lines. Each of the respective steering links 31 and 32 are coupled to flanges outwardly projecting from the fork 26 by means of a lug 35 connected to a post or pin 36. The same construction is included for the connection of the free end of link 31 with the opposite side of the fork 26. Also, the steering rod 33 is connected to an outwardly projecting flange on the front fork 13 by means of a lug 37 and pin 38. The links 31 and 32 as well as rod 33 are connected to a shift and transmission means carried in a housing 40 underneath the frame 11. It is to be understood that there is no connection between housing 40 and the frame 11 which is a major feature of the present invention. It can be seen that the free ends of links 31 and 32 are exposed beyond the rear of frame 11 while the free end of steering rod 33 is exposed from the front end of frame 11. The links and rod are inter-connected within the housing 40 and will be described in detail later.

Referring now to FIG. 3, the rear wheel 25 may be pivoted or rotated to a position with respect to the longitudinal axis of the frame 11 by means of the steering arrangement so that the rear wheel will track the front wheel 12 in a curvilinear path for turning purposes. This positioning of the rear wheel 25 is noted as the turn position and the travel of the rear wheel will follow the arcuate or curvilinear path of the front wheel 12.

With respect to FIG. 4, it can be seen that the rear wheel 25 can be pivoted or rotated to an angular position with respect to the central longitudinal axis of housing 40. In this position, the rear wheel 25 is parallel with respect to the front wheel 12 and permits a crab steering so that the vehicle will progress in an angular orientation with respect to the central longitudinal axis of the housing 40.

Therefore, in the layout shown in FIG. 3, as the front wheel is turned, the rear wheel turns in the opposite direction which causes the vehicle to move in a normal turning fashion. However, in the layout shown in FIG. 4, as the front wheel is turned, the rear wheel turns in the same direction as the front wheel which causes the scooter to crab sideways.

Referring now in detail to FIGS. 5 and 6, the shifting and transmission means located beneath the vehicle frame 11 is illustrated. It can be seen that the housing 40 includes parallel channels 41 and 42 and that the turn-steering link 31 is in sliding position in channel 41 while the crab-steering link 32 resides in sliding condition in channel 42. Roller bearings, such as bearing 43, are carried on the links 31 and 32 for ease of movement within the channels. The shifter lock-arm 44 resides between the links 31 and 32 and include rollers on opposite ends of the arm 44 which selectively engage with either a notch 45 in link 31 or in a notch 46 in link 32. As illustrated, in FIG. 5, the shift lock-arm 44 is engaged in engaged in notch 45 of link 31 so as to effect normal turn steering. To support the lock-arm 44, a pair of swing-arms 47 and 48 have their opposite ends pivotally attached to the housing 40 on one end and to the lock-arm at their opposite ends. The lock-arm is normally biased into engagement with notch 45 in link 31 by means of a return spring 50 having its opposite ends connected to the housing 40 and to the arm 44 respectively. The end of shift cable 24 passes through the housing 40 and terminates at the end of a shift pull spring 52. The end of spring 52 is attached to a retaining pin 53 carried on the swing arm 47. Furthermore, it can be seen that the steering rod 33 is secured to the housing 40 so that as the front wheel is turned by the hand steering mechanism, the rod 33 will move a limited distance forward or a limited distance rearward depending on the direction of turn. Therefore, it can be seen that a solid load bearing path is from the wheel 25 through link 31 and the shift housing 40 to the rod 33 and the front wheel 12 when the shifting and transmission means is in the turn-steering position.

In the crab-steering position shown in FIG. 6, shift cable 24 has been retracted so that the swing arms 47 and 48 will cause the lock-arm 44 to move out of engagement with notch 45 in link 31 where upon the rear fork 26 rotates causing link 32 to be aligned with lock-arm 44 wherein the roller at the end of the arm will engage notch 46. At this time, link 31 merely floats within channel 41 while a load bearing straight path is from the rear wheel 25 through link 32 into the frame 40 and hence to shift-rod 33 and wheel 12.

With respect to operation, in FIGS. 5 and 6 a shift and transmission means is illustrated that allows instant shifting from turn-steering to crab-steering. In normal turn-steering mode, when the vehicle or scooter handles (not shown) are turned, the front wheel turns causing fork 13 to move steering rod 33 in a fore and aft direction. This causes the shifter housing 40 to also move fore and aft. Since shifter lock-arm 44 is engaged into steering link 31, the rear wheel fork 26 moves fore and aft causing the rear wheel to turn in the opposite direction of the front wheel, thereby causing the scooter to "turn" in a normal fashion. This action is possible because shifter lock-arm 44 is engaged only in slot 45 in steering-link 31 and is not engaged in the crab-steering link 32 which is left free-floating during normal steering.

To shift to crab-steering, the hand lever 20 on the handle-bars 18 is pulled or activated which pulls shifter cable 24 and subsequently pulls on shifter spring 52 which causes the shifter lock-arm 44 to try to retract from turn-steering link 31. Unless front and rear wheels are perfectly aligned in a direction parallel with the scooter frame 11, the shifter lock-arm 44 cannot engage into the crab-steering link 32. The shifter lock-arm roller bearing at the end of the arm will travel along the crab-steering link 32 until reaching the curved notch or recess 46 in the crab-steering arm or link 32 which is in-line with the shifter lock-arm roller thereby allowing the shifter to engage into the crab-steering link while at the same time disengaging from the turn-steering link 31 which is now allowed to float freely.

It can be seen now that when the front wheel is turned, fork 13 again causes steering rod 33 to move fore and aft which again causes shifter frame 40 to move fore and aft but now carries with it the crab-steering link 32 that causes the rear wheel to move parallel with the front wheel which now allows the scooter to move at an angle to the central longitudinal axis of the frame and housing in a crab sideways direction.

The operator of the scooter or vehicle is now able to move left or right in a crab fashion as long as the operator holds the handle bar lever 20 in a closed or pulled position. When the operator decides to turn, the operator simply relieves tension on the hand lever. When the operator stops the crabbing direction either left or right and the front wheel is aimed straight forward, the curved recess 45 in turn-steering link 31 will align with shifter lock-arm 44 and return spring 50 will cause the shifter lock-arm to engage back into steering rod 31, thereby putting the scooter or vehicle back into normal steering.

The shifter lock-arm 44 is allowed to move transversely across the midsection of the housing 40 since it is carried by the two swing-arms 47 and 48 which are allowed to pivot on four pivot point pins.

It should also be noted that the three bell cranks, two for the rear wheel and one for the front wheel, have permanently mounted vertical shafts which carry a bushing, such as bushing 55 on post 36. The bushing drives the steering links in a fore and aft direction as the wheels turn. In the manner shown, the steering links have slots at their respective ends that run transversely in which the bearings reside. This allows the shifter frame 40 to stay centered in the scooter frame 11 and not be forced left or right as the links or bell cranks swing in an arc when the wheels are turned.

In view of the foregoing, it can be seen that a unique feature of the present invention is that there is no attachment points of the steering linkage or shifting units to the platform or framework 11 of the vehicle. The complete shifter and transmission unit and steering links float free inside the scooter frame and are only connected to the pivot points of the bell cranks or forks. This greatly facilitates assembly and maintenance of the vehicle. Since most scooters fold their handlebar assembly down and most carry along the front wheel assembly, the slot at the end of the steering rod 33 allows for quick disconnect from the front wheel assembly.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A vehicle comprising:
    an elongated frame;
    a front wheel steering means disposed on one end of said frame including a manual steering mechanism for operating a front wheel;
    a control means disposed on said manual steering mechanism for operating a rear wheel;
    said rear wheel movably carried on an other end of said frame;
    a steering assembly disposed adjacent said frame in spaced-apart relationship with respect to said frame;
    said steering assembly including a housing, shift members within said housing having opposite ends pivotally coupled between said front wheel and said rear wheel;
    a shifter mechanism carried on said housing and operably connected to said shift members for selectively pivoting said rear wheel in response to said control means for steering the vehicle alternately in either a crab position wherein the front and rear wheel are pivoted in substantially the same manner or a normal turn position wherein the front and rear wheel are not pivoted in substantially the same manner;
    said shift members are a pair of elongated links slidably carried on said housing in parallel, spaced-apart relationship; and
    said pair of links are pivotally coupled to said rear wheel on opposite sides thereof and selectively joined together by said shifter mechanism.

2. The vehicles defined in claim 1 including:
a rigid member interconnecting said housing with said front wheel; and
a pivot connection joining said rigid member with said front wheel.

3. The vehicle defined in claim 2 including:
said shifter mechanism including a resilient member connected between a selected one of said pair of links and said housing for normally biasing said selected one of said pair of links and said rear wheel to said normal turn position.

4. The vehicle defined in claim 3 including:
said control means coupled to said shifter mechanism for overriding said resilient member for shifting said shift members to said crab position.

5. The vehicle defined in claim 4 wherein:
said shifter mechanism includes a shifter lock arm movable between said pair of links and at least one swing arm pivotally connecting between said housing and said shifter lock arm responsive to said control means for releasably coupling said shifter lock arm with a selected one of said pair of links.

6. The vehicle defined in claim 5 wherein:
each link of said pair of links includes opposing notches; and
said shift lock arm has opposite ends terminating in rollers alternately engageable with said notches in response to said control means via said swing arm.

7. The vehicle defined in claim 6 including:
a pair of parallel related further swing arms having pivots connectable with said housing and said shift lock arm and operable in unison to position said shifter lock arm into engagement with either of said notches in said pair of links.

8. A two-wheeled scooter comprising:
a standing frame having a front end and a rear end;
a pivotal front wheel fork carried on said front end rotatably mounting a front wheel;
a pivotal rear wheel fork carried on said rear end rotatably mounting a rear wheel;
a handle bar steering arrangement connected to said front wheel fork whereby said front wheel is turnable about a vertical axis;
a shifting mechanism operably mounted between said front fork and said rear fork in spaced-relationship to said standing frame for aligning said front wheel and said rear wheel to track along an arcuate path or to track along parallel paths;
control means mounted on said handle bar steering arrangement and coupled to said shifting mechanism for selectively positioning said rear wheel along said arcuate path or along said parallel path;
said shifting mechanism includes a housing slidably mounting a pair of links with one end of each link pivotally connected to said rear wheel fork and the other end of each link connected together by a lock arm; and
said control means connected to said lock arm for moving said lock arm to engage a selected one of said links.

9. The two-wheeled scooter defined in claim 8 wherein:
said arcuate path constitutes a turn tracking position of said front wheel and said rear wheel and said parallel path constitutes a crab tracking position maintaining said front wheel and said rear wheel along spaced-apart linear parallel tracks.

10. The two-wheeled scooter defined in claim 9 including:
a rigid rod disposed on said housing and pivotally engaged with said front fork.

11. The two-wheeled scooter defined in claim 10 including:
a resilient member coupled between a selected one of said pair of links and said lock arm normally biasing said lock arm into engagement with said selected one of said pair of links.

12. The two-wheeled scooter defined in claim 10 including:
a resilient member contractible between said lock arm and a first link of said pair for maintaining said shifting mechanism and said rear wheel in said turn tracking position.

13. The two-wheeled scooter defined in claim 12 including:
a pair of swing arms pivotally coupling said housing with said lock arm; and
said control means coupled to said swing arms for controllably moving said lock arm into and out of engagement with said pair of links.

14. An in-line vehicle comprising:
an elongated standing frame having a central longitudinal axis with a front wheel at one end of said frame and a rear wheel at an other end of said frame;
said front wheel and said rear wheel lying on said central longitudinal axis of said frame so that the vehicle progresses in a linear straight-forward line of travel;
shifting means interconnecting said front wheel and said rear wheel for changing said linear straight-forward line of travel to a curvilinear path with respect to said central longitudinal axis with said rear wheel following said front wheel or for changing to an angular orientation of said rear wheel and said front wheel with respect to said central longitudinal axis;
control means carried on said frame operatively coupled with said shifting means for changing said front wheel and said rear wheel direction of travel; and
said angular orientation constitutes said front wheel and said rear wheel having parallel lines of travel in spaced-apart relationship that are angular with respect to said central longitudinal axis.

15. The in-line vehicle defined in claim 14 including:
a housing supporting said shifting means in fixed spaced apart relationship with respect to said frame;
said shifting means including a linkage assembly pivotally connected between said front wheel and said rear wheel; and
said linkage assembly responsive to said control means for changing the direction of travel of the vehicle.

* * * * *